UNITED STATES PATENT OFFICE.

ABRAHAM WYNBERG, OF AMSTERDAM, NETHERLANDS.

WAX-LIKE PRODUCT OBTAINED FROM SUGAR-CANE.

941,401.  Specification of Letters Patent.  Patented Nov. 30, 1909.

No Drawing.  Application filed February 3, 1908.  Serial No. 414,012.

*To all whom it may concern:*

Be it known that I, ABRAHAM WYNBERG, citizen of the Netherlands, subject of the Queen of the Netherlands, residing at Amsterdam, in the Kingdom of the Netherlands, have invented certain new and useful Improvements in Wax-Like Products Obtained from Sugar-Cane, of which the following is a full, clear, and exact description.

The object of this invention is a new manufacture viz. a waxlike body, obtained by the treating of the sugar cane.

The rind of the sugar cane is covered with a thin layer of a wax- and fatlike substance. This substance according to scientific investigations due to the applicant, possesses special physical and chemical properties, which render these wax- and fatlike bodies especially suitable for technical or industrial use. These wax- and fatlike substances, up till now have been considered in the whole cane sugar industry as waste products, and have found no use whatever, except as fuel or fertilizer.

According to the processes of manufacturing sugar from sugar cane known hitherto, this latter has been crushed and otherwise treated with the view of obtaining and extracting sugar exclusively. According to the present manufacturing methods the sugar-cane containing these wax- and fatlike substances are submitted to the entire process (to that of grinding, extracting, diffusion, defecation and so on) without any technical or otherwise advantageous result. It has on the contrary been found, that the presence of these wax- and fatlike substances is to the disadvantage of the extraction of sugar, because the wax- and fatlike substances surround the individual parts or grains of the sugar, preventing the same from becoming dissolved, whereby the wax-covered grains remain as waste in the filter-cake.

As is generally known, the filter-cakes resulting from the cane sugar industry are at present absolutely worthless, although they contain according to the analyses due to Geerligs (see Noel Deerr, *Sugar and the Sugar Cane*, Manchester, Norman Rodger, 1905, p. 173) 4.12% wax and 10.20% sugar in the presence of 69.72% water. When the water has been evaporated the dry filter-cake contains about 12% wax, sometimes more, and nearly 30% sugar all of which is lost by present processes. I have found, by long investigations, that the wax- and fat-like bodies covering the sugar cane, may be applied with great advantage to technical use provided that the same have been submitted to a suitable treatment.

The recovering of wax- and fatlike substances and the reproduction of same in a form rendering them suitable for industrial use, may be attained in different ways and by different methods. Such a method of recovering the wax- and fatlike substances forms the object of another application for patent of mine, Ser. No. 414,013, filed February 3, 1908, and consists in submitting the wax- and other fatlike substances, contained in the residues of the cane sugar industry and especially in the filter-cakes to a special treatment.

The wax- and fatlike substances, recovered according to the method above referred to, from the residues of the cane sugar industry are obtained as raw wax or as a raw fat substance and is characterized by its very dark intensive color, varying from yellow-green to black-brown, though it may show also any other color. This raw product may be submitted to any suitable refining and bleaching process.

The raw wax and fatty bodies recovered directly from the residues of the cane sugar industry have the characteristic properties of being partially saponifiable, possessing a very high melting point, in the average 80° centigrade and a great hardness and the capacity of producing a brilliant gloss. This substance possesses further the peculiar feature of being composed of two bodies, the one being a soft easily saponifiable wax- or fatlike body of a light color, the other a very hard and but partially saponifiable one of darker shade. The softer ingredient has a melting point of 35-55, acid number 10-40, saponification number 120-242, iodin number 49-68, acetyl number 15-47. The harder but partially saponifiable ingredient has a melting point of 60-91° C., acid number 4-10, saponification number 25-45, iodin number 6-14, acetyl number 77-95. The separation of these wax- and fatlike bodies from each other may be obtained in any suitable way and by any convenient means, as by dissolving these bodies with a solvent such as benzin and crystallizing out the separate products in the manner described in my aforesaid application.

The wax obtained in accordance with the present process has a composition which is shown by the following analysis: Melting point 50°–75° C., acid No. 8–12, saponification No. 40.7–81.2, iodin No. 12–15, acetyl No. 75–80. The analysis of the refined product gave data corresponding therewith.

It has been found that the quality of the product varies according to the particular treatment to which the sugar cane is subjected, and the figures given in the above analysis are therefore not to be considered as positively defining the limits of each particular characteristic, as the figures may in particular cases be higher or lower and may vary with regard to each other, in a manner different from that shown in the tables. The claims are therefore intended to cover broadly the waxy compounds above described, discovered by me to be capable of recovery from sugar-cane residues.

I claim:

1. The herein described product consisting of a composition of a waxlike compound and of a fatlike compound obtained by the treatment of the residues of the sugar-cane manufacture, the waxlike compounds having a melting point of 60–91° C., acid number 4–10, saponification number 6–14, acetyl number 77–95, and the fatlike compounds having a melting point of 35–55, acid number 10–40, saponification number 120–242, iodin number 49–68, acetyl number 15–47.

2. The herein described product consisting of a waxlike compound, obtained by treatment of the residues of sugar-cane manufacture, having a melting point of from 50–75° C., acid number 8–12, saponification number 40.7–81.2, iodin number 12–15, acetyl number 75–80 and having a degree of hardness less than the natural wax found in such sugar cane.

3. The herein described product obtained from the residues of sugar-cane manufacture consisting of a wax-like compound having a melting point of 60–91° C., acid number 4–10, saponification number 6–14, acetyl number 77–95.

4. The herein described product obtained from the residues of sugar-cane manufacture consisting of a fatlike compound having a melting point of 35–55, acid number 10–40, saponification number 120–242, iodin number 49–68, acetyl number 15–47.

In witness whereof, I subscribe my signature, in presence of two witnesses.

ABRAHAM WYNBERG.

Witnesses:
JAN HENDRIK HULSHAFF,
AUGUST SIEGFRIED DOCAN.